United States Patent [19]

Blackburn

[11] 4,064,704
[45] Dec. 27, 1977

[54] VIBRATION ANALYZING APPARATUS
[75] Inventor: Bobby J. Blackburn, Columbus, Ohio
[73] Assignee: IRD Mechanalysis, Inc., Columbus, Ohio
[21] Appl. No.: 637,892
[22] Filed: Dec. 5, 1975
[51] Int. Cl.² .............................................. G01H 3/10
[52] U.S. Cl. ...................................... 73/660; 73/462
[58] Field of Search ................... 73/71.4, 462; 340/261

[56] References Cited
U.S. PATENT DOCUMENTS

| | | | |
|---|---|---|---|
| 2,947,172 | 8/1960 | King | 73/462 |
| 3,211,009 | 10/1965 | Lucka | 73/462 |
| 3,331,252 | 7/1967 | Thomas et al. | 73/462 |
| 3,608,381 | 9/1971 | Hines | 73/462 |
| 3,661,016 | 5/1972 | Dopp | 73/462 |
| 3,835,712 | 9/1974 | Muller | 73/462 |

FOREIGN PATENT DOCUMENTS 1,132,136  10/1968  United Kingdom ................... 73/462

Primary Examiner—Richard C. Queisser
Assistant Examiner—Stephen A. Kreitman
Attorney, Agent, or Firm—Thomas H. Murray

[57] ABSTRACT

Vibration analyzing apparatus of the type employing a phase angle meter for determining the angular location of a point of unbalance on a rotating member with respect to a mark on the member, and capable of determining the approximate balance correction weight and its location about the rotor circumference the first time a rotor is spun up. Application of the indicated correction weight will reduce the unbalance on most typical rotors, assuming that they are approximately symmetrical about the center point of the longitudinal axis of the rotor. The apparatus enables most rotors to be balanced with a reasonable degree of accuracy without the necessity for adding trial weights, utilizing plane separators, or shaking with a known force in order to calibrate the apparatus.

2 Claims, 2 Drawing Figures

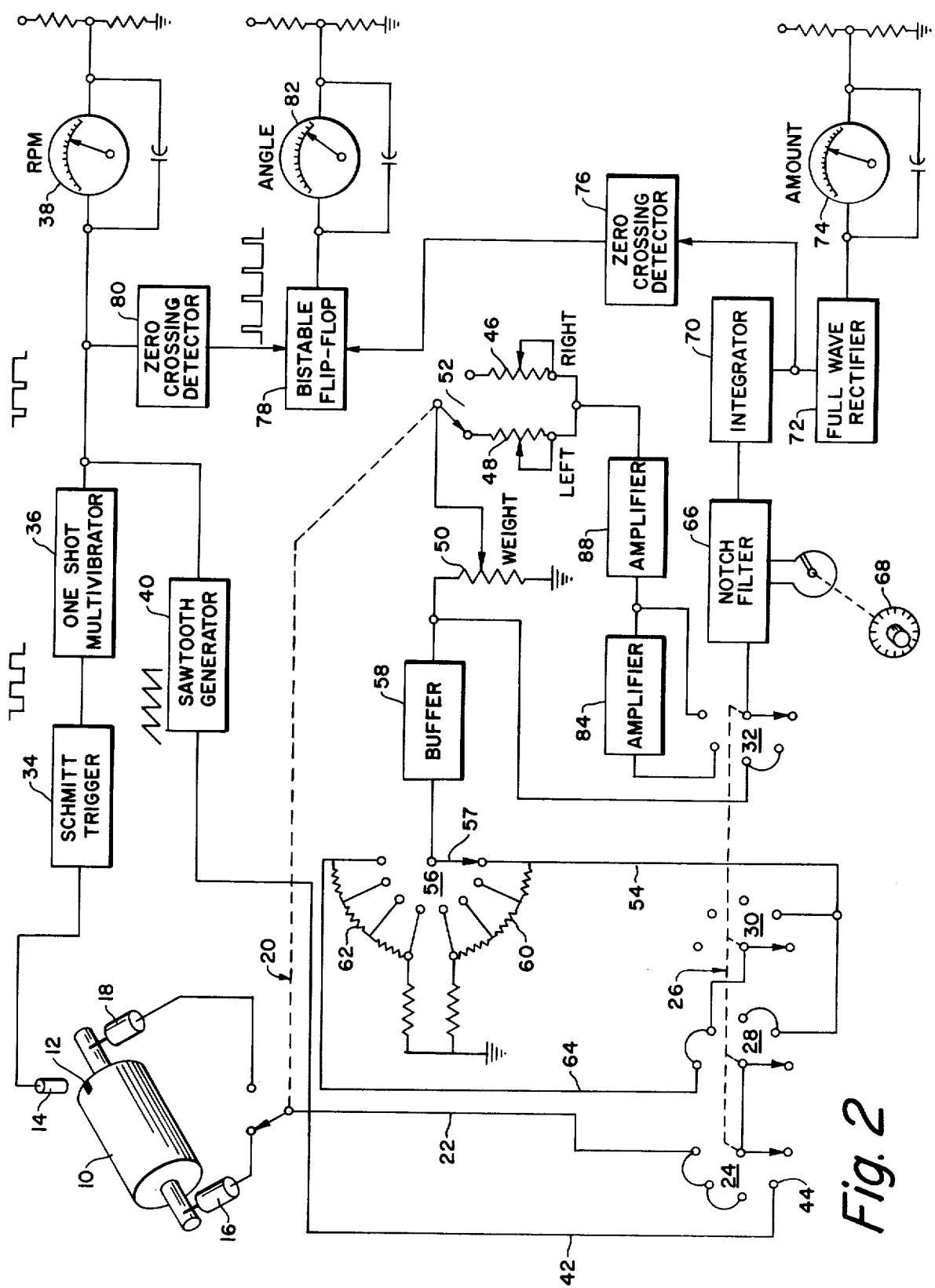

VIBRATION ANALYZING APPARATUS

BACKGROUND OF THE INVENTION

As is known, vibration analyzing apparatus utilizes an electromagnetic transducer which transforms the vibrations of a rotating body into an electrical signal having a frequency equal to that of the vibrations, an amplitude proportional to the magnitude of the vibrations, and a phase displacement relative to a reference signal which is related to the location of the point of unbalance on a rotating body. Thus, the transducer transforms the vibrations into an electrical signal equivalent to the vibrations. This signal is then filtered to eliminate all frequencies other than those due to a single rotating part. The resulting vibration signal is then applied to apparatus including an amplitude meter for indicating displacement of the vibrations, a frequency meter for indicating the signal frequency, and a phase determining means such as a phase meter or strobe light.

In the past, a balancing operation required that a trial weight be aded to the rotor and the unbalance determined by vector calculations. Alternatively, plane separators could be used to separate the vibrations in one plane from those in another or the rotor could be vibrated initially with a known force to calibrate the apparatus. These prior art systems, while workable, are cumbersome, complicated and require the use of highly skilled personnel.

SUMMARY OF THE INVENTION

In accordance with the present invention, a new and improved vibration analyzing apparatus is provided wherein the approximate balance correction weight and its location can be determined the first time a rotor is spun up and without the necessity for trial weights, shaking with a known force and/or plane separators. It is only necessary to know the weight of the rotor and the radius from its longitudinal axis at which a trial weight will be added.

The invention is predicated on the fact that for many practical rotors the cross effect is small. As a result, the unbalance force on a rigid rotating member can be approximated by the equation:

$$\delta = (wr)/W \cdot (K)$$

where:
  $\delta$ is the vibration amplitude at the pickup sensing point, in mils,
  $w$ is the unbalance weight,
  $r$ is the radial distance between the longitudinal axis of the rotor and the unbalance weight,
  $W$ is the total weight of the rotor, and
  $K$ is an empirical constant related to the balancing machine rotor configuration and instrument sensitivity.

Thus, knowing the rotor weight, $W$, the radius, $r$, and the magnitude $\delta$, of the displacement, the correction weight, $w$, can be determined. The value of K is a parameter of the electronics design.

In the preferred embodiment of the invention shown herein, there is provided an electromagnetic transducer operatively connected to a rotating body to be balanced and adapted to produce a displacement signal having an amplitude and phase dependent upon the amount and location of unbalance in a rotating body. Additionally, means are provided for producing a pulsed signal in which the frequency of the pulses is proportional to the rotational speed of the rotating body. This latter means preferably comprises a photocell trained on a visible mark on a rotating body such that a pulse will be produced once during each revolution. Means responsive to the aforesaid pulsed signal are provided for producing an oscillatory signal, preferably a sawtooth waveform, which also has a frequency proportional to the speed of the rotating body. The vibration analyzing apparatus itself includes a bandpass filter together with phase determining means having a pair of inputs to which signals whose phases are to be compared are applied. The output of the bandpass filter is applied to one of the inputs of the phase determining means; while the aforesaid pulsed signal is applied to the other input of the phase determining means. Switch means selectively connects the oscillatory sawtooth waveform to the input of the bandpass filter for calibrating the phase determining means, or connects the displacement signal to the input of the same bandpass filter to effect a balancing operation after the phase determining means has been calibrated. Thus, by applying the sawtooth waveform to the input of the bandpass filter initially, the filter can be calibrated to pass only those displacement frequencies due to the vibrations induced by the rotating part.

In passing through the bandpass filter means and other circuit components, the sawtooth waveform or the displacement signal, as the case may be, inherently will be shifted in phase; and for the specific example given herein, it will be shifted in phase by an amount equal to 270°. Therefore, in initially calibrating the vibration analyzing apparatus, the bandpass filter is tuned until the phase meter reads 270°. Thereafter, when a displacement signal is caused to pass through the bandpass filter, the phase shift is automatically compensated for; and if, for example, a point of unbalance is coincident with the visual mark on the aforesaid rotating body, the phase meter will read zero.

DESCRIPTION OF THE PREFERRED EMBODIMENT

Figure 1:
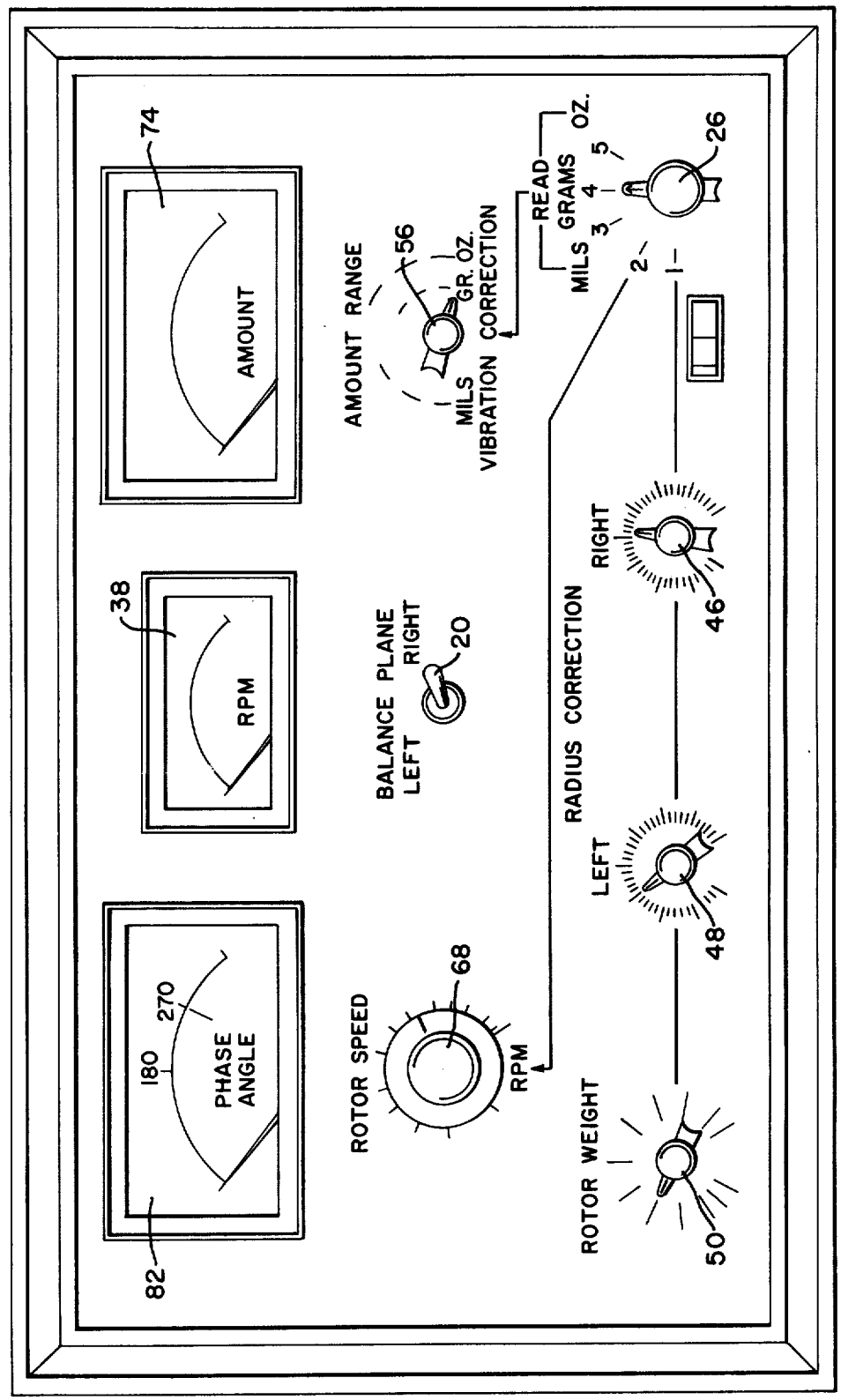

The above and other objects and features of the invention will become apparent from the following detailed description taken in connection with the accompanying drawings which form a part of this specification, and in which:

FIG. 1 is a front view of the vibration analyzing apparatus of the invention showing the controls therefor as well as the amount, RPM and phase angle meters of the apparatus; and FIG. 2 is a block schematic diagram of the analyzing apparatus of the invention.

With reference now to the drawings, FIGS. 1 and 2, there is shown a rotating member 10 to be balanced. In the example given, the member 10 is light-colored and has a dark spot 12 at one point around its periphery such that a photocell 14 will be actuated once during each rotation of the member 10 at precisely the same point. Alternatively, the spot 12 could be replaced by a member which affects a magnetic field, such as a slot or rib in a magnetically-permeable body; and the photocell 14 replaced by a magnetic pickup, with the same overall effect. The vibrations caused by the rotating member 10 are sensed by two electromagnetic transducers or vibration pickups 16 and 18 at opposite ends of the member 10. As the member 10 rotates, the vibration pickups produce alternating current signals each having a frequency equal to the rotational speed of the member 10 and an amplitude or displacement proportional to the magnitude of vibrations induced in member 10. Suitable transducers for this purpose are described, for example, in U.S. Pat. Nos. 2,754,435 and 3,157,852.

The displacement signal from transducer 16 or 18 can be applied through switch 20 (also shown in FIG. 1) and thence through lead 22 to three contacts of the first bank 24 of a four-bank, five-position selector wiper switch 26. The remaining three banks of the switch 26 are identified by the reference numerals 28, 30 and 32.

Reverting again to the photocell 14 of FIG. 2, its output is applied to a Schmitt trigger circuit 34 which, as is known, will change its output voltage level in response to a change in the input voltage above a predetermined magnitude. Hence, each time the mark 12 passes beneath the photocell 14, a pulse will be produced at the output of the Schmitt trigger circuit 34. These pulses are applied to a one-shot multivibrator 36, the output of which is also a pulsed signal in which the pulse repetition frequency of the pulses is proportional to the freguency of rotation of the rotating member 10. The pulses at the output of the one-shot multivibrator 36 are applied directly to an RPM meter 38, also shown in FIG. 1, the arrangement being such that the meter 38 will read-out the speed of the rotating member 10 in revolutions per minute. That is, a capacitor 39 in shunt with meter 38 integrates the fixed-width pulses from multivibrator 36; and the integrated widths are proportional to the frequency of the pulses and, hence, rotor speed.

The output of the one-shot multivibrator 36 is also applied to a sawtooth generator 40, the output of the generator 40 being a sawtooth waveform whose frequency corresponds to the frequency of rotation of the member 10. This waveform is applied through lead 42 to the second contact 44 on the first bank 24 of switch 26. The control knob for selector switch 26 is shown in FIG. 1 and is also identified by the reference numeral 26. It will be noted that it has five positions corresponding to the five contact points on each of the banks 24-32.

The No. 1 position of the control knob of switch 26 as shown in FIG. 1 can be called the setup position. With the knob in this position, the output of the sawtooth generator 40 is not utilized, nor is the displacement signal from transducer 16 or 18. However, during the setup procedure, the operator adjusts three potentiometers identified by the reference numerals 46, 48 and 50 in FIG. 1, these same potentiometers being shown in FIG. 2. The toggle switch 20, also shown in FIG. 1, has two positions in one of which the transducer 16 is connected to the analyzer, and in the other of which the transducer 18 is connected to the analyzer. This same toggle switch 20 is provided with contacts 52 which connect the movable wiper brush on the aforesaid potentiometer 50 to either potentiometer 46 or potentiometer 48. The potentiometers 46 and 48 are utilized to compensate for variations in the radius from the center of the rotating member at which a correction weight is to be placed. This adjustment is made for both the right end and left end of the rotating member. The potentiometer 50 is adjusted to compensate for the rotor weight so that a displacement signal from a rotating member will indicate an approximate ounce or gram correction calibration on the amount meter.

After the potentiometers 46, 48 and 50 have thus been adjusted, the switch 26 is moved to the No. 2 position wherein all wiper brushes contact the second contacts on each of the banks 24-32. In this position, the lead 42 at the output of sawtooth generator 40 is now connected to lead 54 and through an amount range switch 56 to a buffer 58. The operation of the amount range switch will hereinafter be described in greater detail. However, for purposes of the immediate description, it comprises a first voltage divider 60 connected to ground and a second voltage divider 62 also connected to ground, points on the respective voltage dividers being connected to contact points which are engaged by a movable wiper 57 of the switch 56. One end of the voltage divider 60 is connected to the lead 54 as shown; whereas one end of the voltage divider 62 is connected to lead 64 for a purpose which will hereinafter be explained.

Assuming, again, that the switch 26 is in position No. 2, the output of buffer 58 will then be applied to a band-pass or notch filter 66, the pass-band of which can be varied by means of a rotor speed potentiometer 68 also shown in FIG. 1. The output of the notch filter is first applied to an integrator 70 and then to a full-wave rectifier 72 before being applied to an amount meter 74, also shown in FIG. 1. During this initial calibration step, however, the reading on the amount meter can be ignored since the signal passing through the notch filter 66 is that derived from sawtooth generator 40 and is not a displacement signal.

The output in the integrator 70 is also applied through a zero crossing detector 76 to one side of a bistable flip-flop 78. The other side of the flip-flop 78 has applied thereto the output of a zero crossing detector 80 responsive to the pulsed signal at the output of the one-shot multivibrator 36. It will be readily appreciated that the pulses from the one-shot multivibrator 36 will correspond in frequency to the frequency of the sawtooth waveform from generator 40. Furthermore, depending upon the phase displacement of the sawtooth waveform with respect to the pulses from multivibrator 36, the phase of pulses from the zero crossing detectors 76 and 80 will vary. This phase difference also varies the width of the pulses at the output of the bistable flip-flop 78, the greater the phase difference, the greater the width of the pulses from the flip-flop at a given frequency. The pulses from flip-flop 78, in turn, are applied to a phase angle meter 82 also shown in FIG. 1.

Under the circumstances assumed with selector switch 26 in position No. 2, the phase angle meter 82 will read the phase difference between pulses from multivibrator 36 and the zero crossings of the sawtooth generator 40. It should be noted, however, that the signal, in passing through the various circuit components, and in particular the notch filter 66 and integrator 70, will inherently be shifted in phase in an amount equal to 270°. Therefore, in calibrating the instrument, the potentiometer 68 is tuned to the approximate speed of the rotating member 10 and is then vernier adjusted until the meter 82 reads 270°. At this point, it is knwon that the filter 66 is tuned to the operating speed or frequency of the rotating member 10.

In order to determine the magnitude of the vibration signal (i.e., displacement), the switch 26 is moved to position No. 3 whereby lead 22 from transducer 16 or 18 is now connected to lead 54. From lead 54, the signal passes through the amount range switch 56 to the buffer 58 and, hence, through the notch filter 66 and integrator 70 to the full-wave rectifier 72. Assuming that the range switch 56 is in the proper position, the amount meter 74 will now read mils displacement. If the dial on meter 74 sweeps to its extreme position, it is known that the signal strength is too high and, accordingly, the wiper on range switch 56 is advanced further on the potentiometer 60. The first position, for example, may be such as to give the reading on meter 74 in 0.1 increments or graduations. In another position, it may give the reading in 10 mil increments; and in still another position where the full extent of voltage divider 60 is used, it may give a reading in 100 mil increments.

At the same time, the displacement signal passing through the notch filter 66 and integrator 70 is again applied to the zero crossing detector 76 and its output compared with the output of one-shot multivibrator 36. This phase comparison, therefore, gives a reading on angle meter 82 which is equal to the angular difference between the mark 12 on the rotating member 10 and a point of unbalance.

In order to effect a balancing operation, the wiper brush on amount range switch 56 is advanced to a point on the voltage divider 62, this being to the right of center as shown in FIG. 1. At the same time, the selector switch 26 is advanced to position No. 4 or No. 5, depending upon whether a read-out in grams or ounces is desired. With the switch 26 in either position No. 4 or No. 5, the displacement signal on lead 22 now passes to lead 64 and potentiometer 62. Depending upon the signal strength of the displacement signal, the amount range switch wiper brush is connected to potentiometer 62 to read-out, for example, in ounces, tens of ounces, hundreds of ounces, or thousands of ounces. At the same time, contact bank 32 of switch 26 connects the input of the notch filter 66 to either amplifier 84 or 88, depending upon whether a read-out in grams or ounces is desired. The amplifiers 84 and 88 are, of course, calibrated for the respective weight measurements in either grams or ounces.

The displacement signal now passes through the buffer 58 and potentiometer 50 to either potentiometer 46 or 48, depending upon whether the displacement signal is received from the right end or left end of the rotating member 10. After amplification in amplifier 84 or 88, it then passes through the notch filter 66, integrator 70 and rectifier 72 to the amount meter 74. The amount of unbalance is thus indicated by the amount meter 74; while the phase angle meter 82 continues to indicate the angular displacement between the mark 12 on member 10 and the point of unbalance. A weight, corresponding to that indicated on the amount meter is now added at a point on the rotor opposite the point of unbalance; and the rotor will be at least approximately balanced. Further improvement in balance can then be effected by repeating the foregoing steps and adding successively smaller weights until the amount meter reads close to zero.

Although the invention has been shown in connection with a certain specific embodiment, it will be readily apparent to those skilled in the art that various changes in form and arrangement of parts may be made to suit requirements without departing from the spirit and scope of the invention.

I claim:

1. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, means for modifying said displacement signal as a function of the weight of said rotating body and the radius from the longitudinal axis of the rotating body at which a weight is added to balance the same, means for producing a pulsed signal in which the frequency of the pulses is proportional to the rotational speed of said rotating body, phase determining means including zero crossing detectors and a readout meter responsive to said pulsed signal and to said displacement signal for indicating on said readout meter the phase displacement of a point of unbalance on said rotating body with respect to a fixed point on the body, and an amount indicating means responsive to said displacement signal after modification for indicating the amount of unbalance in said rotating body.

2. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, means for producing a pulsed signal in which the frequency of the pulses is proportional to the rotational speed of said rotating body, means responsive to said pulsed signal for producing an oscillatory signal also having a frequency proportional to the speed of the rotating body, a bandpass filter, phase determining means having a pair of inputs to which signals whose phases are to be compared are applied, means for applying the output of said bandpass filter to one of the inputs of the phase determining means, means for applying said pulsed signal to the other input of said phase determining means, and switch means for selectively connecting said oscillatory signal to the input of said bandpass filter for calibrating said phase determining means, said switch means also serving to selectively connect said displacement signal to the input of said bandpass filter to effect a balancing operation after the phase determining means has been calibrated; wherein said phase determining means comprises first and second zero crossing detectors connected to said bandpass filter and said means for producing a pulsed signal, a flip-flop having its opposite sides connected to the respective zero crossing detectors, and a phase angle meter responsive to output pulses from said flip-flop.

* * * * *